US011762896B2

(12) United States Patent
Muthuswamy et al.

(10) Patent No.: US 11,762,896 B2
(45) Date of Patent: Sep. 19, 2023

(54) RELATIONSHIP DISCOVERY AND QUANTIFICATION

(71) Applicant: International Business Machines Corporation, Armonk, NY (US)

(72) Inventors: Srinivasan S. Muthuswamy, Bangalore (IN); Mukesh Kumar, Bangalore (IN); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/099,078

(22) Filed: Nov. 16, 2020

(65) Prior Publication Data

US 2022/0156304 A1   May 19, 2022

(51) Int. Cl.
G06F 16/36 (2019.01)
G06F 16/33 (2019.01)
G06F 16/25 (2019.01)

(52) U.S. Cl.
CPC .......... *G06F 16/367* (2019.01); *G06F 16/254* (2019.01); *G06F 16/3331* (2019.01)

(58) Field of Classification Search
CPC ............ G06F 16/367; G06F 16/3331
See application file for complete search history.

(56) References Cited

U.S. PATENT DOCUMENTS

| 7,866,542 | B2 | 1/2011 | Herman et al. |
| 7,962,486 | B2 | 6/2011 | Adair et al. |
| 8,965,914 | B2 | 2/2015 | Eshwar et al. |
| 9,239,830 | B2 | 1/2016 | Gopalakrishnan et al. |
| 9,396,253 | B2 | 7/2016 | Porpora et al. |
| 9,501,467 | B2 | 11/2016 | Light et al. |
| 9,535,902 | B1 | 1/2017 | Michalak et al. |
| 10,042,911 | B2 | 8/2018 | Deshpande et al. |
| 10,424,016 | B2 | 9/2019 | Byron et al. |
| 2007/0174167 | A1 | 7/2007 | Natella et al. |
| 2015/0278691 | A1* | 10/2015 | Xia ............... G06F 16/90344 706/11 |

(Continued)

FOREIGN PATENT DOCUMENTS

CN    110275965 A    9/2019

OTHER PUBLICATIONS

Asim et al., "A survey of ontology learning techniques and applications", Database, vol. 2018, Published: Oct. 5, 2018, 24 pages.

(Continued)

*Primary Examiner* — Charles D Adams
(74) *Attorney, Agent, or Firm* — James L. Olsen

(57) ABSTRACT

Aspects of the present disclosure relate to identifying and quantifying relationships between entities. Data sources can be queried to receive data regarding a party. Entities can be extracted from the data to receive a set of entities, wherein the party is a first entity of the set of entities. An ontological structure can be built that interrelates entities within the set of entities. An initial relationship strength can be determined between the first entity and a second entity based on co-occurrence between the first and second entities, wherein the second entity is a second party. A relationship score can be calculated between the first and second entities based on the initial relationship strength and at least one additional factor.

16 Claims, 6 Drawing Sheets

(56) References Cited

U.S. PATENT DOCUMENTS

2018/0285755 A1   10/2018  Krauss
2019/0095530 A1*   3/2019  Booker ................. G06F 16/313
2019/0377819 A1*  12/2019  Filliben ................. G06N 3/084
2020/0090053 A1    3/2020  Silverman et al.
2020/0104576 A1*   4/2020  Usuki ................... G06V 20/30
2021/0042344 A1*   2/2021  Hu ....................... G06N 5/022

OTHER PUBLICATIONS

Mell et al., "The NIST Definition of Cloud Computing", Recommendations of the National Institute of Standards and Technology, Sep. 2011, 7 pages.
Examination Report, UK Patent Application No. 2115087.5, 2022, International Filing date, Oct. 21, 2021, dated Oct. 19, 2022, 3 Pgs.
Examination Report, UK Patent Application No. 2115087.5, 2022, International Filing date, Oct. 21, 2021, dated Aug. 26, 2022, 3 Pgs.

* cited by examiner

RELATIONSHIP DISCOVERY AND QUANTIFICATION

BACKGROUND

The present disclosure relates generally to the field of data analysis, and in particular, to discovering and quantifying non-obvious relationships between entities within data.

There is a vast amount of unstructured data that can be leveraged to gain valuable insights therefrom. Data analysis techniques attempt to interpret meaningful information from unstructured data. This can be completed such that future decisions can be made based on information (e.g., patterns) extracted from unstructured data.

SUMMARY

Embodiments of the present disclosure include a method, computer program product, and system for identifying and quantifying relationships between entities. Data sources can be queried to receive data regarding a party. Entities can be extracted from the data to receive a set of entities, wherein the party is a first entity of the set of entities. An ontological structure can be built that interrelates entities within the set of entities. An initial relationship strength can be determined between the first entity and a second entity based on co-occurrence between the first and second entities, wherein the second entity is a second party. A relationship score can be calculated between the first and second entities based on the initial relationship strength and at least one additional factor.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
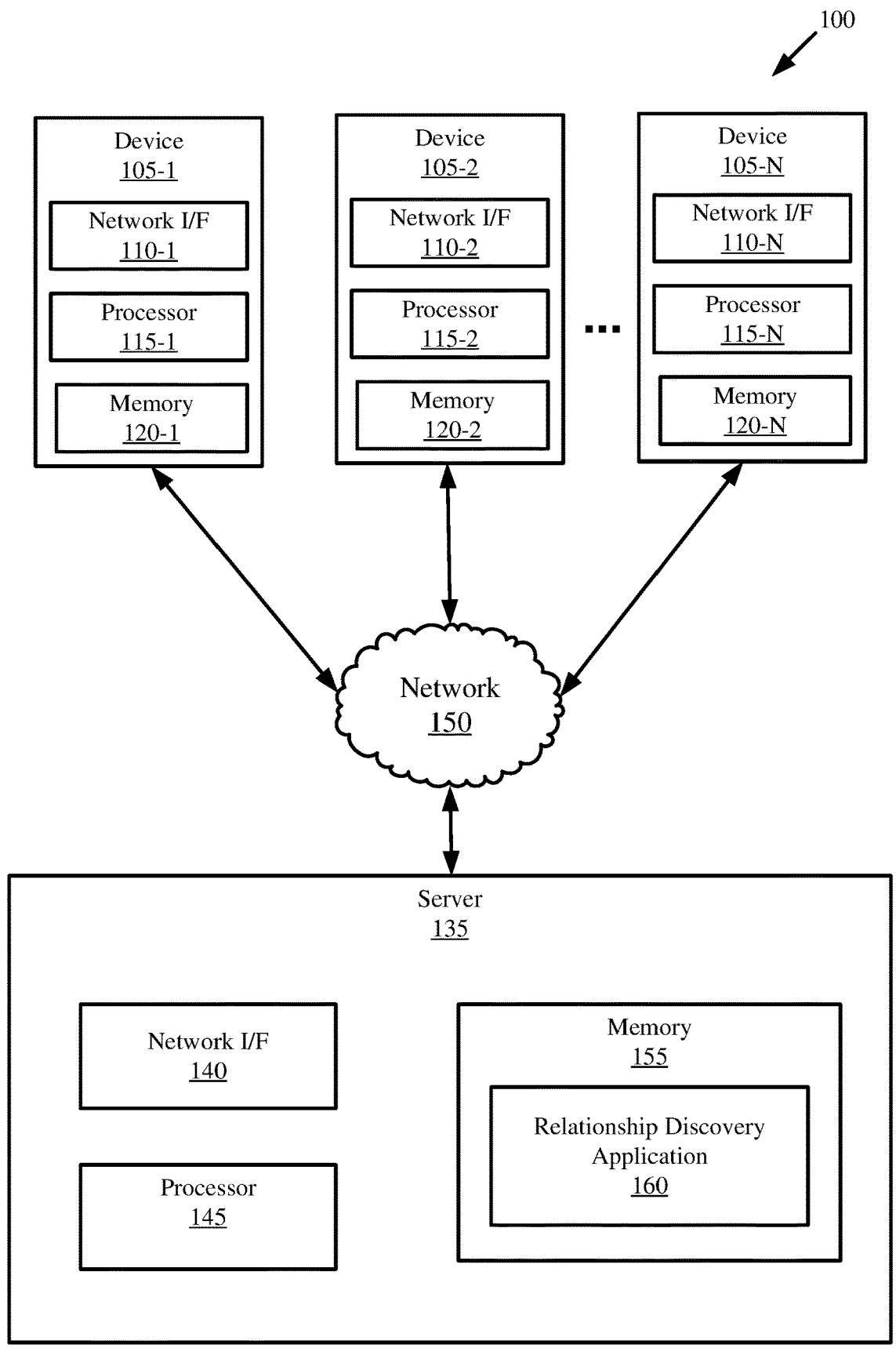
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data analysis, and in particular discovering and quantifying non-obvious relationships between entities within data. While the present disclosure is not necessarily limited to such applications, various aspects of the disclosure can be appreciated through a discussion of various examples using this context.

There is a vast amount of unstructured data that can be leveraged to gain valuable insights therefrom. Data analysis techniques attempt to interpret meaningful information from unstructured data. This can be completed such that future decisions can be made based on information (e.g., patterns) extracted from unstructured data.

It can be important to understand relationships between entities within data. Relationships describe the way in which two or more entities (e.g., people, places, objects, etc.) are connected. Discovering relationships between entities within data can be beneficial in areas such as natural language processing (e.g., semantics), health (e.g., mining health data for insights regarding diseases, symptoms, diagnoses, treatments, etc.), and fraud detection. As an example, understanding how a given party (e.g., person or company) relates to other parties may provide insights regarding whether or not the party conducted misconduct (e.g., fraud) with the aid of one or more other parties.

Aspects of the present disclosure relate to identifying and quantifying relationships between entities. Data sources can be queried to receive data regarding a party. Entities can be extracted from the data to receive a set of entities, wherein the party is a first entity of the set of entities. An ontological structure can be built that interrelates entities within the set of entities. An initial relationship strength can be determined between the first entity and a second entity based on co-occurrence between the first and second entities, wherein the second entity is a second party. A relationship score can be calculated between the first and second entities based on the initial relationship strength and at least one additional factor.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a relationship discovery application 160. The relationship discovery application 160 can be configured to identify relationships between a given party and other entities within data (e.g., unstructured data) and thereafter quantify the relationships (e.g., by calculating a relationship score) between the party and other entities within the data.

The relationship discovery application 160 can first be configured to receive data associated with a party (e.g., a person, company, group of people, etc.). In embodiments, receiving data associated with the party can include querying one or more sources (e.g., Internet sources, databases, etc.) for data that includes the party. The data associated with the party can then be filtered to, for example, disambiguate related parties, remove redundant documents, remove unrelated data, etc. Entity extraction (e.g., named entity recognition (NER)) can then be performed to extract entities (e.g., names, organizations, locations, quantities, time expressions, etc.) from the data associated with the party. A knowledge graph (e.g., an ontological structure) can then be generated based on the extracted entities, where the knowledge graph depicts relationships (e.g., hierarchical and non-hierarchical) between the party and other entities (e.g., counter parties) extracted from the data.

In embodiments, an initial relationship strength can be determined between the party and other entities within the data. For example, the initial relationship strength can be calculated based on a number of times the party co-occurred with a counterparty divided by the number of times the party co-occurred with other parties. The initial relationship strength between a given party and a counterparty can be referred to as a "togetherness index."

Thereafter, the relationship discovery application 160 can analyze additional factors that may impact the relationship score (e.g., between a party and counterparty). For example, a relationship timeline between the party and a counterparty can be determined by analyzing the received data. This can include determining the periods of time in which the party and the counterparty have been related. For example, the time of initial co-occurrence, the length of co-occurrence, time gaps in which co-occurrence does not occur, recency of co-occurrence, etc. can be determined.

In embodiments, the relationship discovery application 160 can determine reasons for co-occurrence. For example, a classifier (e.g., a natural language processing (NLP) based classifier, a machine learning (ML) based classifier, etc.) can be used to classify one or more reasons for co-occurrence for each co-occurrence instance based on analyzation of the received data. The reasons for co-occurrence can impact the relationship score as certain reasons for co-occurrence may have a greater impact on the relationship score calculated between the party and a counterparty. For example, co-occurrence involving a classification "scandal" may have a greater impact on calculating a relationship score as compared to co-occurrence involving a classification "networking event."

Thereafter, the relationship discovery application 160 can determine a network surrounding the party and the counterparty. This can provide indications regarding entities that bridge the party and counterparty. Thus, even if the party and counterparty are not directly related, indirect relationships can be identified based on entities that are common to the party and counterparty. For example, the network can indicate that the party and counterparty are associated with similar locations and/or similar parties. This can further enhance the relationship score calculation.

The togetherness index, timeline of co-occurrence, reasons for co-occurrence, and/or network surrounding the party and counterparty can be used to calculate a relationship score. In embodiments, a normalized value indicative of the relationship strength can be calculated for each factor and the relationship score can be calculated by adding each factor multiplied by a respective weight. For example, the relationship score R can be calculated according to the formula $R = f_1 \times w_1 + f_2 \times w_2 + f_3 \times w_3 \ldots + f_n \times w_n$, where f represents each factor, w represents each weight, and n represents the total number of factors. It is noted that the above-mentioned factors are merely exemplary, and any suitable type and/or number of factors used to calculate the relationship score can be implemented without departing from the spirit and scope of the present disclosure. Further, the manner in which the relationship score is calculated (e.g., by adding a number of weighted factors) can also vary, and is not limited to those described.

In some embodiments, the relationship score can represent risk between a party and a counterparty. For example, the magnitude of the relationship score can represent risk that a party and counterparty may be involved in misconduct such as fraud. As an example, if a given party, Party A, and a counterparty, Party B, are involved in an insurance claim, the relationship discovery application 160 may analyze unstructured data associated with Party A and Party B. Though the relationship between Party A and Party B may not be obvious, upon analyzation of the received data (e.g., news, social media, Internet resources, securities and exchange commission (SEC) filings, etc.), the relationship discovery application 160 may identify that Party A and Party B are indeed related. For example, based on analysis of the data, it may be determined that Party A and Party B have co-occurred in the past, the reasons for co-occurrence relate to misconduct, and further that Party A and Party B are involved in a network of related entities. Thus, the relationship score can be calculated based on the above-factors and may represent risk that the parties are involved in an insurance claim fraud. In these embodiments, the weighting of factors may be adjusted to more closely represent risk associated with the parties. For example, reasons for co-occurrence may be weighted relatively higher than other relationship score factors.

In embodiments, one or more actions may be issued based on the relationship score. In some embodiments, relationship scores can be added to edges of a knowledge graph between the party and respective related entities. This can enhance knowledge within the domain by specifying relational attributes of the ontological structure including the party of interest. Further, the calculated relationship score may be more accurate than those calculated by other means (e.g., based on NLP context or using a ML algorithm). This is because the relationship score considers additional factors (e.g., co-occurrence timeline, co-occurrence reasons, related networks) that other relationship strength quantifiers do not.

In some embodiments, the relationship score can be compared to one or more threshold values and one or more actions may be issued based on the comparison between the relationship score to the one or more thresholds. For example, in embodiments where the relationship score represents risk, if the relationship score exceeds a threshold, actions can include, for example: further investigating one or more entities, denying one or more transactions (e.g., insurance claims or account withdrawals), and/or contacting authorities responsible for preventing misconduct.

Though reference is made to examples where the relationship score represents risks, it is noted that the relationship score can represent any suitable characteristic and is not limited to those described.

Though this disclosure pertains to the collection of personal data, it is noted that in embodiments, users opt-in to the system. In doing so, they are informed of what data is collected and how it will be used, that any collected personal data may be encrypted while being used, that the users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
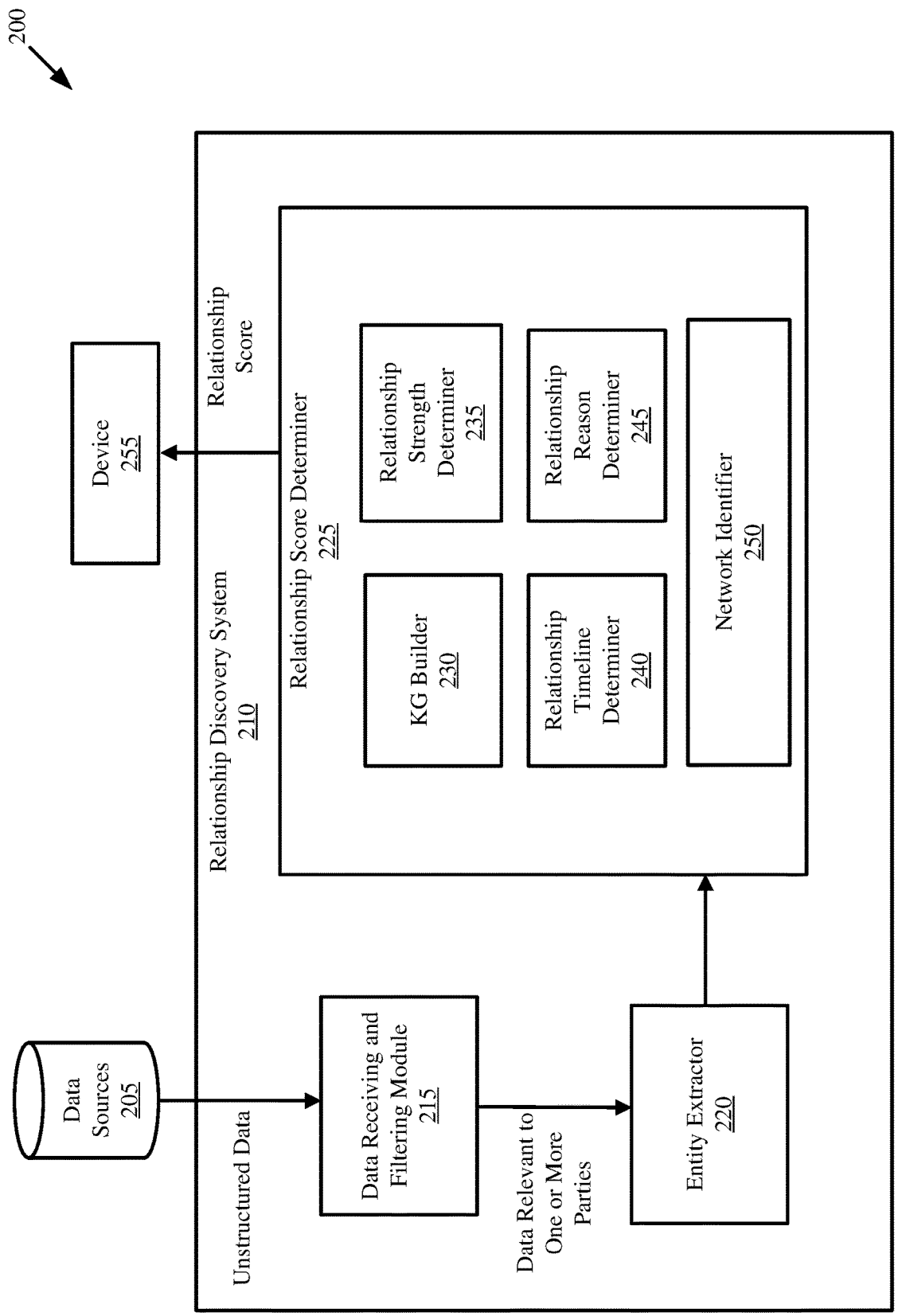
FIG. 2 is a block diagram illustrating a relationship discovery system, in accordance with embodiments of the present disclosure.

Referring now to FIG. 2, shown is a diagram illustrating a computing environment 200 in which illustrative embodiments of the present disclosure can be implemented. The computing environment 200 includes data sources 205, a relationship discovery system 210, and a device 255 which may be communicatively coupled using a network (e.g., network 150 of FIG. 1). It is noted that though a single device 255 is shown, in embodiments, device 255 may represent a plurality of devices, servers, and/or computing nodes. Further, the various models, modules, systems, and components illustrated within relationship discovery system 210 can exist, if at all, across a plurality of computing devices.

The relationship discovery system 210 can be configured to identify and quantify relationships between a party and one or more counterparties. The functionalities of the relationship discovery system 210 can the same as, or substantially similar to, relationship discovery application 160 of FIG. 1. The relationship discovery system 210 includes a data receiving and filtering module 215, an entity extractor 220, and a relationship score determiner 225. The functionalities of the data receiving and filtering module 215, entity extractor 220, and relationship score determiner 225 can be processor executable instructions that can be executed by a dedicated or shared processor using received inputs.

The data receiving and filtering module 215 can be configured to receive data associated with one or more parties. In embodiments, the data receiving and filtering module 215 can be configured to collect data from data sources 205 in response to a user command (e.g., from device 255) or a predetermined trigger (e.g., the filing of an insurance claim, a user opt-in, etc.). The data receiving and filtering module 215 can query data sources 205 to collect data about one or more parties, for example, by using the name of the one or more parties as an input query. In embodiments, the queried parties may include a party of interest and one or more potentially related counterparties. Thereafter, the data sources 205 can return all relevant data related to the queried parties. The data receiving and filtering module 215 can then be configured to filter the received data to, for example, disambiguate related parties (e.g., parties with similar names), remove redundant documents, and remove unrelated data.

In embodiments, the data receiving and filtering module 215 can be configured to pre-process the data by, for example, converting data format (e.g., from a pdf to plaintext), converting audio data to text (e.g., using audio to text conversion), converting image data to text (e.g., by extracting terms from images using image recognition), and/or performing natural language processing techniques on the data such as part of speech (POS) tagging, parsing, lemmatization, syntactic analysis, and semantic analysis.

Data sources 205 can include any suitable type of data, including text, image, audio, and video data. Further, data sources 205 can originate from any suitable source, including Internet Resources (e.g., social media data, GOOGLE®) and databases (e.g., a relational database such as IBM® DB2). Examples of data sources 205 include social media pages/posts, SEC documents, WIKIPEDIA® entries, and news articles, to name a few.

The data relevant to the one or more parties is then transmitted to entity extractor 220. The entity extractor 220 can be configured to extract entities from the data. An "entity" can be a person, organization, company, place, time expression, monetary value, quantity, or any other suitable entity mapped to a corresponding label. In embodiments, the entity extractor can be configured to perform named-entity recognition (NER). NER can be completed in any suitable manner. In some embodiments, the entity extractor 220 can be configured to perform a neural-network based NER algorithm. In these embodiments, a neural network can be trained to recognize entity types of entities present in input data. In some embodiments, a rules-based NER process can be implemented. Such systems include IBM® SystemT and IBM INFOSPHERE® Data Quality Framework (DQF). However, entities can be extracted from data in any other suitable manner. For example, techniques for concept extraction from data can be applied to extract entities. Such techniques include C-value/NC-value, contrastive analysis, co-occurrence analysis, latent semantic analysis, clustering, syntactic analysis, subcategorization frames, and use of seed words, to name a few.

Upon extracting entities, the data is transmitted to the relationship score determiner 225 such that relationships between the entities can be identified and quantified. A knowledge graph (KG) builder 230 of the relationship score determiner 225 can be configured to build a knowledge graph including concepts/relations surrounding the queried party or parties. Building the knowledge graph can include applying techniques for ontology learning including classifying concepts (e.g., receiving the entities extracted by the entity extractor 220), deriving concept hierarchy (e.g., using hierarchical clustering methods), learning non-taxonomic relations (e.g., using association rule mining, term substitution, dependency analysis, lexicon syntactic pattern analysis, etc.), and discovering rules (e.g., using inductive logic programming). The knowledge graph visually represents relations (e.g., hierarchical and non-hierarchical) between extracted entities. However, in some embodiments, an ontological data structure can be built without necessarily requiring the generation of a knowledge graph without departing from the spirit and scope of the present disclosure.

A relationship strength determiner 235 can be configured to determine an initial relationship strength (e.g., togetherness index) between parties (e.g., classified as concepts) within the knowledge graph. Determining the initial relationship strength can be completed in any suitable manner. In some embodiments, the initial relationship strength is determined based on the number of times a first party and second party co-occurred divided by the number of times the first and second party co-occurred with other entities. For example, if the first and second party co-occurred 10 times, and if the first and second party co-occurred with other parties 100 times, then the initial relationship strength can be calculated as 10/100 (e.g., 0.10, 10%). However, the initial relationship strength can be determined in any other suitable manner. For example, the initial relationship strength can be determined based on the number of times the first and second party co-occurred divided by the number of times the first party co-occurred with other parties or based on the number of times the first and second party co-occurred divided by the number of times the second party co-occurred with other parties. Upon determining the initial relationship strength, additional factors that impact the relationship score calculated by the relationship score determiner 225 can be determined.

A relationship timeline determiner 240 can be configured to determine time periods of co-occurrence between the party and relevant counterparties. This can include determining the initial point in time of co-occurrence, frequency of co-occurrence over time, time gaps in which co-occurrence does not occur, and the most recent point in time of co-occurrence. Co-occurrence timings can be used to enhance the relationship score calculation, as the recency, length, and frequency of co-occurrence over time all impact the strength of a relationship between two given parties. In embodiments, the relationship timeline determiner 240 can determine timelines of co-occurrence based on derived time expressions (e.g., from entity extractor 220) as compared to co-occurrence instances. For example, if a news article published on "Oct. 21, 2015" includes co-occurrence between a first and second party, then "Oct. 21, 2015" can be included within the timeline of co-occurrence. This can be completed at each instance of co-occurrence. That is, each instance of co-occurrence can be directly associated with a time expression until a timeline of co-occurrence based on the available data is generated between the party and counterparty.

A relationship reason determiner 245 can be configured to classify reasons for co-occurrence between a party and a counterparty. This can include, for each instance of co-occurrence, classifying a reason for co-occurrence. In embodiments, classifying the reason for co-occurrence can be completed based on context surrounding the co-occurrence between the parties. For example, if a sentence reads, "John met Thomas at dinner," the reason determiner 245 can specify, for this co-occurrence instance between John and Thomas, that the reason for co-occurrence is "dinner." In embodiments, a classifier, such as an NLP or ML based classifier, can be configured to classify reasons for co-occurrence between two parties. Reasons for co-occurrence can impact the calculation of the relationship score as certain reasons for co-occurrence can have a greater impact on the relationship score compared to others.

A network identifier 250 can be configured to identify a network surrounding the party and the counterparty. This can provide indications regarding entities that bridge the party and counterparty. Thus, even if the party and counterparty are not directly related, indirect relationships can be identified based on entities that are common to the party and counterparty. For example, the network can indicate that the party and counterparty are associated with similar locations and/or similar parties. In embodiments, the network identifier 250 can identify a number of entities that the party and counterparty are related to each other through. This can be used to enhance the relationship score calculation.

The relationship score determiner 225 can then be configured to convert each of the initial relationship strength (e.g., togetherness index), the relationship timeline, the relationship reasons, and the network between the party and counterparty into a normalized factor value to be used to calculate the relationship score. For example, a relationship score factor value can be generated for each of the relationship strength, relationship timeline, relationship reasons, and network having a value between 0 and 1. Thereafter, each of the factors can be multiplied by a respective weight and added to arrive at the final relationship score. For example, the relationship score R can be calculated according to the formula $R = f_1 \times w_1 + f_2 \times w_2 + f_3 \times w_3 \ldots + f_n \times w_n$, where f represents each factor, w represents each weight, and n represents the total number of factors. It is noted that the above-mentioned factors are merely exemplary, and any suitable type and/or number of factors used to calculate the relationship score can be implemented without departing from the spirit and scope of the present disclosure. Further, the manner in which the relationship score is calculated (e.g., by adding a number of weighted factors) can also vary, and is not limited to those described.

In embodiments, the conversion of each factor into a normalized value and the weighting of factors used to calculate the relationship score can be fine-tuned, for example, using machine learning algorithms. That is, feedback can be received regarding the strength of the relationship between a given party and a counterparty and the feedback can be compared to the relationship score calculated by the relationship score determiner 225. Based on the feedback as compared to the output relationship score, one or more algorithms used to normalize the factors into values and/or assign weightings to each factor can be adjusted.

Machine learning algorithms that can be used to adjust the normalization value calculated for each factor and/or adjust the weight associated with each factor include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Upon calculating the relationship score, the relationship discovery system 210 transmits the relationship score to device 255. Thereafter, the relationship score can be used in any suitable manner. In some embodiments, the relationship score can be appended to relational edges (e.g., stored as an attribute of a relational edge) of an ontological structure between the party and counterparty which the relationship score is calculated for. This can enhance knowledge within the ontological domain including the party and counterparty.

In some embodiments, the relationship score can represent a characteristic relevant to the initial inquiry between the party and one or more counterparties. For example, if the relationship between two parties is inspected due to a fraud inquiry, the relationship score can represent risk that the two parties are related and thus may be involved in fraudulent activity. In these embodiments, if the relationship score exceeds a threshold value, one or more actions can be issued to mitigate potentially fraudulent activity. For example, if the relationship score exceeds a threshold, actions can include alerting an authority responsible for mitigating fraud, denying a transaction (e.g., an insurance claim) initiated by the party, and/or further investigating the party. However, any number of actions can be issued based on the perceived risk of the party.

As discussed herein, "concept," "entity," and "party" can all refer to the same idea. Though different terminology may be used interchangeably, this terminology is used in the context of the applied technology. A party can generally refer to at least one individual, such as a person, organization, or company. An entity can refer to a label of the party generated by a NER algorithm. A concept can refer to the name of the entity as present in an ontological structure (e.g., a knowledge graph).

Figure 3:
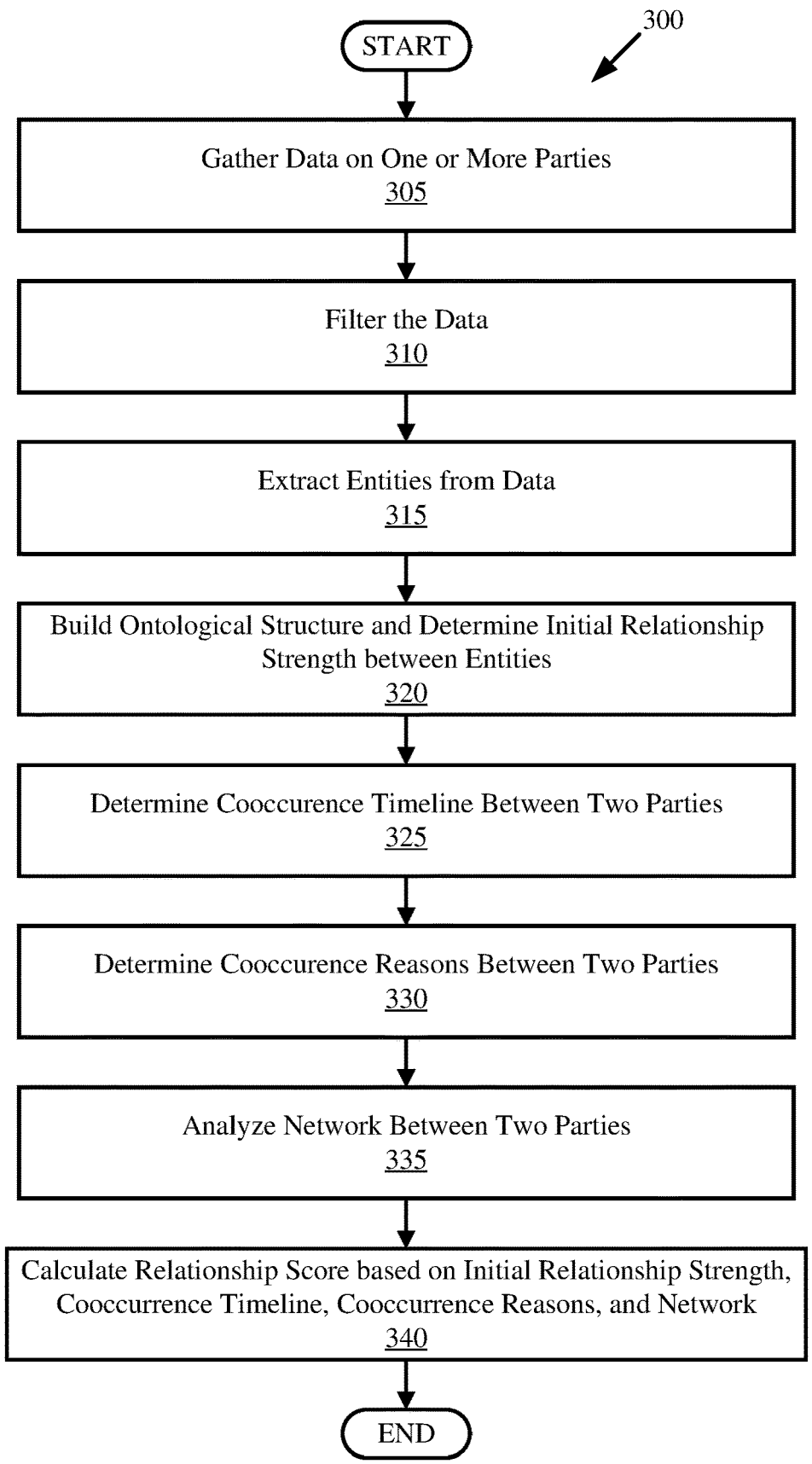
FIG. 3 is a flow-diagram illustrating a method for identifying and quantifying relationships between a party and at least one counterparty, in accordance with embodiments of the present disclosure.

Referring now to FIG. 3, shown is a flow-diagram illustrating an example method 300 for identifying and quantifying a relationship between a party and at least one counterparty, in accordance with embodiments of the present disclosure. One or more operations of method 300 can be completed by one or more computing devices (e.g., devices 105, sever 135, device 255, and/or relationship discovery system 210).

Method 300 initiates at operation 305, where data is gathered on one or more parties. The data can be gathered in the same, or a substantially similar manner as described with respect to the relationship discovery application 160 of FIG. 1 or the data receiving and filtering module 215 of FIG. 2. For example, the data on the party can be gathered based on a user command or predetermined condition. In embodiments, data can be gathered by querying the name of the party against Internet Resources and/or databases. Any suitable data can be received, including data sources 205 described with respect to FIG. 2.

The data is then filtered. This is illustrated at operation 310. Filtering the data can include disambiguating related entity names, pruning extraneous data, organizing the data, and/or sanitizing the data.

Entities are then extracted from the data. This is illustrated at operation 315. Entity extraction can be performed in the same, or a substantially similar manner, as described with respect to entity extractor 220 of FIG. 2. For example, a neural-based or rule-based NER algorithm can be applied to extract entities from the data.

An ontological structure is then generated and an initial relationship strength is determined between the party (e.g., a first entity) and one or more counterparties (e.g., a second to $n^{th}$ entity). This is illustrated at operation 320. Generating the ontological structure can be completed in the same, or a substantially similar manner, as described with respect to the KG builder 230 of FIG. 2. For example, ontology learning techniques can be applied to build a knowledge graph interrelating the party to other parties (e.g., entities) within the data. Determining an initial relationship strength between the party and a counterparty can be completed in the same, or a substantially similar manner, as described with respect to the relationship strength determiner 235 of FIG. 2. For example, determining an initial relationship strength can be completed by dividing a number of co-occurrences of the first party and second party by a total number of co-occurrences of the first and second party with other parties.

A co-occurrence timeline is then determined between the party and the counterparty. This is illustrated at operation 325. Determining the co-occurrence timeline can be completed in the same, or a substantially similar manner, as described with respect to the relationship timeline determiner 240 of FIG. 2. For example, the initial point in time of co-occurrence, frequency of co-occurrence over time, time gaps in which co-occurrence does not occur, and the most recent point in time of co-occurrence can be determined at operation 325. Co-occurrence timings can be used to enhance the relationship score calculation, as the recency, length, and frequency of co-occurrence over time all impact the strength of a relationship between two given parties. In embodiments, timelines of co-occurrence can be determined based on derived time expressions (e.g., obtained from entity extractor 220) as compared to co-occurrence instances.

Co-occurrence reasons are then determined between the party and counterparty. This is illustrated at operation 330. Determining co-occurrence reasons can be completed in the same, or a substantially similar manner, as described with respect to the relationship reason determiner 245 of FIG. 2. For example, an NLP or ML based classifier can be configured to determine a reason for co-occurrence at each instance of co-occurrence.

A network of entities that relate the party and counterparty is then determined. This is illustrated at operation 335. Determining the network of entities that relate the party and counterparty can be completed in the same, or a substantially similar manner, as described with respect to the network identifier 250 of FIG. 2. For example, a number of entities that relate the party to the counterparty can be determined to identify the network.

A relationship score is then calculated based on the initial relationship strength, the co-occurrence timeline, the co-occurrence reasons, and the network. This is illustrated at operation 340. Calculating the relationship score can be completed in the same, or a substantially similar manner, as described with respect to the relationship score determiner 225 of FIG. 2. For example, a normalized value can be generated for each factor (e.g., initial relationship strength, co-occurrence timeline, co-occurrence reasons, and the network) and the normalized value of each factor can be weighted and added to arrive at the relationship score. Upon calculating the relationship score, the relationship score can be utilized in any manner. For example, the relationship score can be appended to relational edges of an ontology to enhance knowledge surrounding the party. In some embodiments, the relationship score can represent a characteristic related to the initial inquiry of the party. For example, in a financial context, the relationship score can signify risk of fraud between two parties and may be relied upon when approving or denying transactions.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
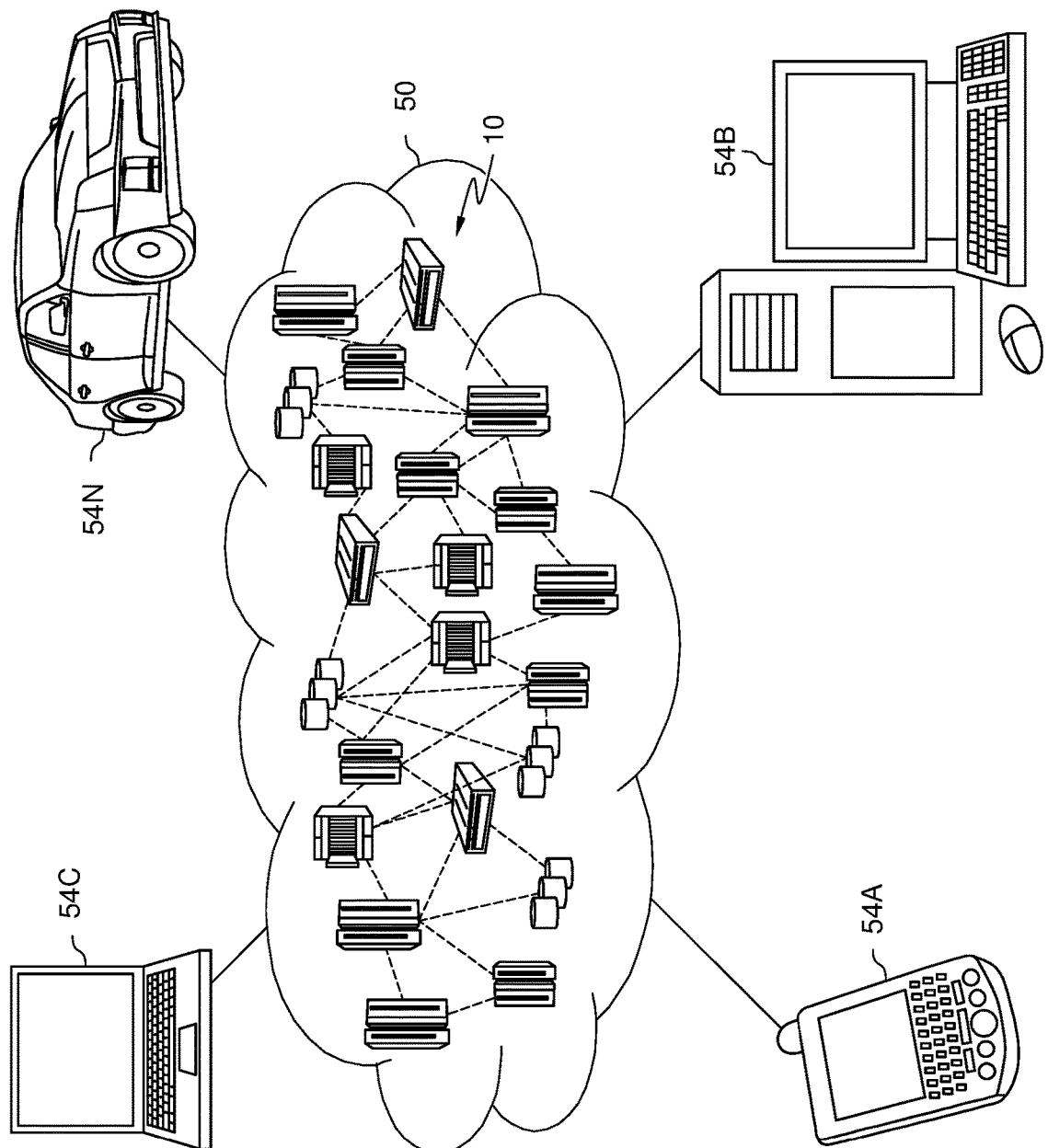
FIG. 4 is a diagram illustrating a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
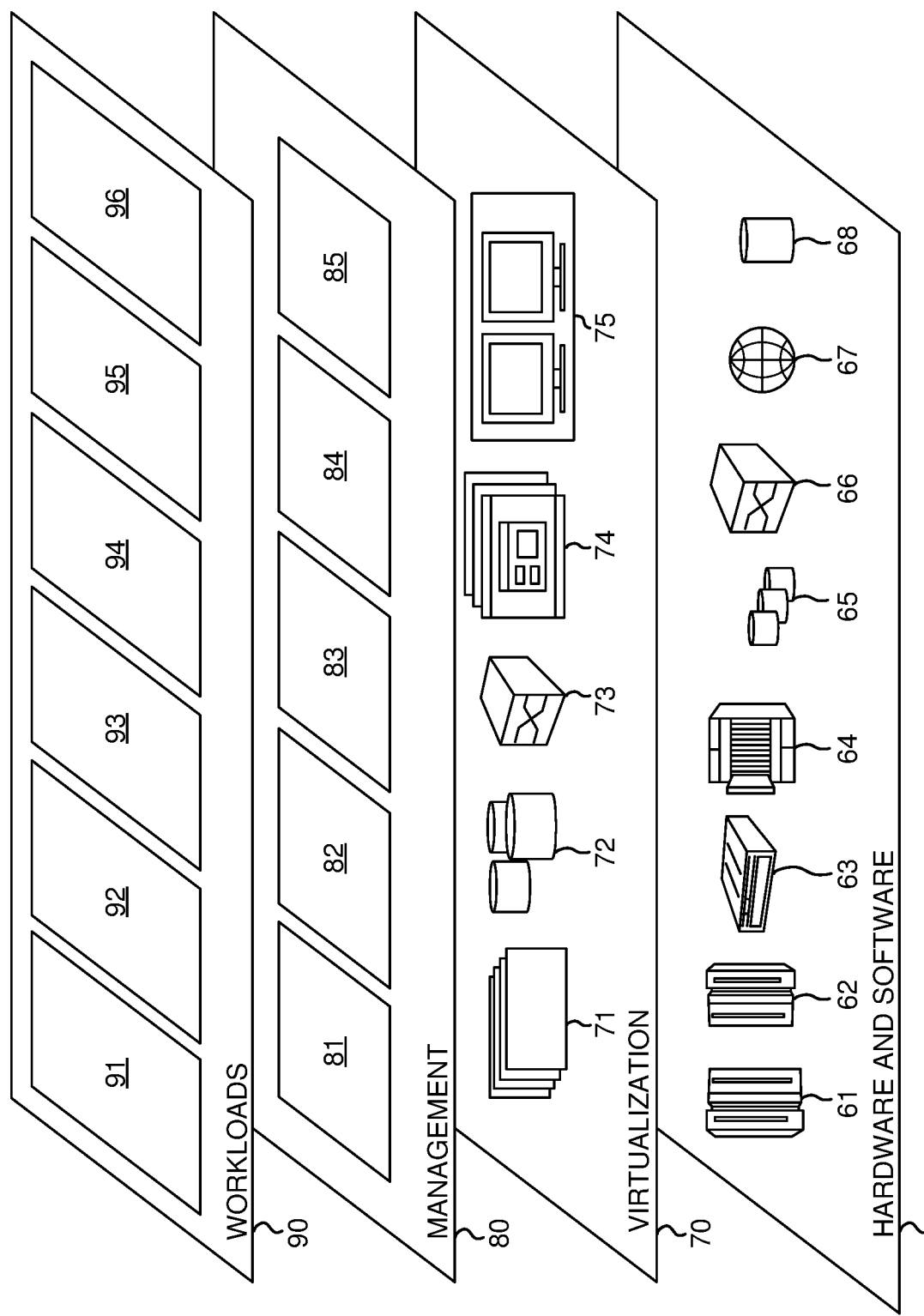
FIG. 5 is a block diagram illustrating abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and relationship identification and quantification 96.

Figure 6:
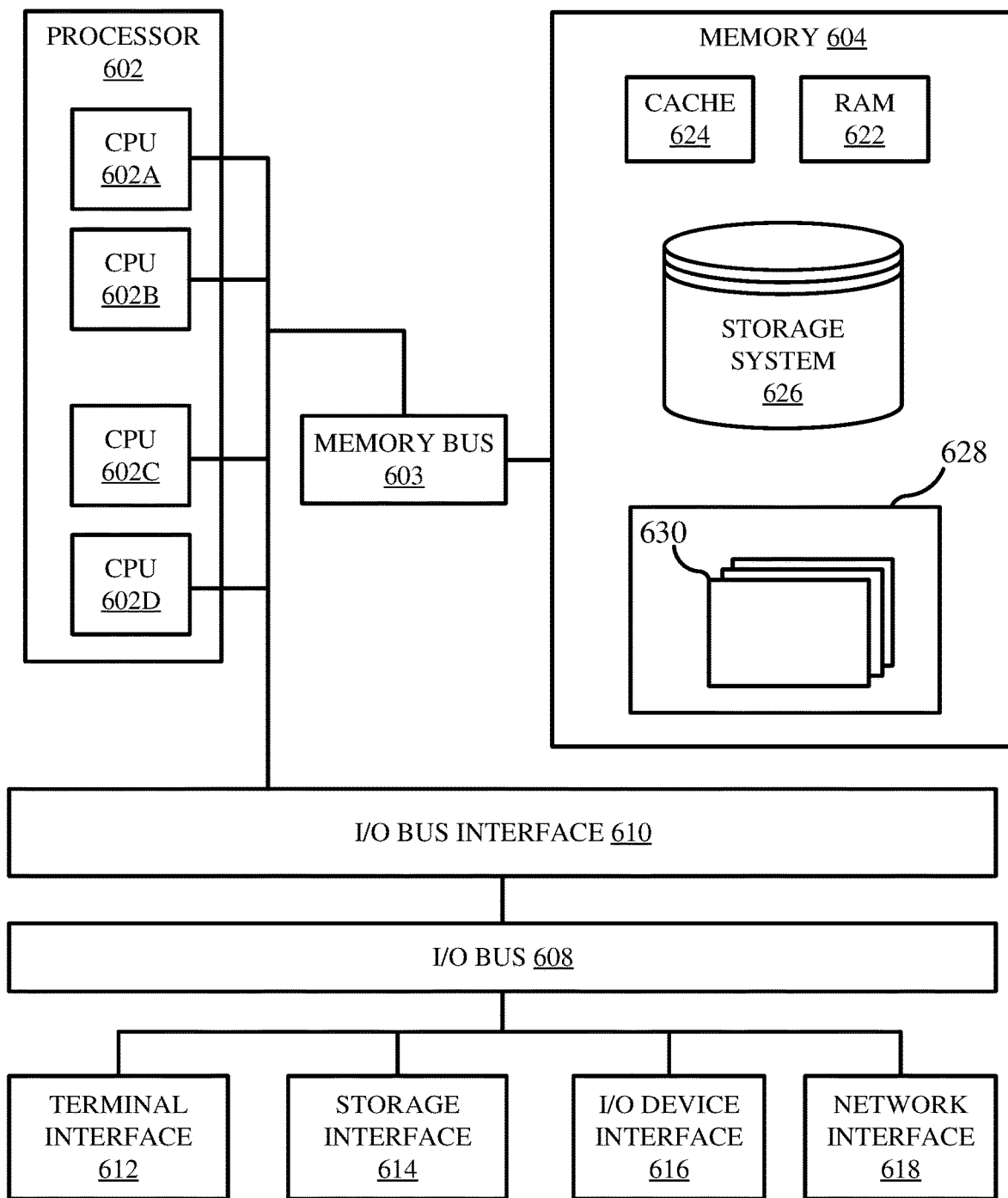
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105, server 135, device 255, relationship discovery system 210) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   querying data sources to receive data regarding a party;
   extracting, by performing a neural network based named-entity recognition (NER) on the data sources, entities from the data to receive a set of entities, wherein the party is a first entity of the set of entities;
   building an ontological structure that interrelates entities within the set of entities;
   determining an initial relationship strength between the first entity and a second entity based on a number of times the first and second entities co-occur divided by a total number of times the first entity co-occurs with each other entity within the set of entities, wherein the second entity is a second party;
   determining a timeline of co-occurrence between the first and second entities, wherein the timeline of co-occurrence includes an initial co-occurrence time, a frequency of co-occurrence over time, and a recency of a last co-occurrence between the first and second entities;
   calculating a normalized timeline of co-occurrence value based on the timeline of co-occurrence;
   calculating a relationship score between the first and second entities by adding the initial relationship strength multiplied by a first weight and the normalized timeline of co-occurrence value multiplied by a second weight, wherein the relationship score represents a risk that the party and the second party are involved in fraudulent activity;
   comparing the relationship score to a threshold; and
   denying, in response to the relationship score exceeding the threshold, a transaction initiated by the party.

2. The method of claim 1, wherein the number of times the first entity and second entity co-occur is a co-occurrence between the first and second entities, wherein prior to calculating the relationship score, the method further comprises:

determining a set of reasons for the co-occurrence between the first and second entities, wherein the relationship score is calculated based on the initial relationship strength and the set of reasons for the co-occurrence.

3. The method of claim 1, wherein prior to calculating the relationship score, the method further comprises:
determining a network of entities of the set of entities that relate first and second entities, wherein the relationship score is calculated based on the initial relationship strength and the network of entities.

4. The method of claim 1, wherein the relationship score is appended to the ontological structure as an attribute to a relationship between the first and second entities.

5. The method of claim 3, further comprising:
calculating a normalized set of reasons for co-occurrence value based on the set of reasons for the co-occurrence between the first and second entities, wherein the relationship score is calculated by adding the initial relationship strength multiplied by the first weight, the normalized timeline of co-occurrence value multiplied by the second weight, and the normalized set of reasons for co-occurrence value multiplied by a third weight.

6. The method of claim 5, wherein the set of reasons for co-occurrence are determined using a natural language processing (NLP) classifier.

7. The method of claim 3, further comprising:
calculating a normalized network of entities value based on the determined network of entities of the set of entities that relate the first and second entities, wherein the relationship score is calculated by adding the initial relationship strength multiplied by the first weight, the normalized timeline of co-occurrence value multiplied by the second weight, and the normalized network of entities value multiplied by a third weight.

8. A system comprising:
one or more processors; and
one or more computer-readable storage media storing program instructions which, when executed by the one or more processors, are configured to cause the one or more processors to perform a method comprising:
querying data sources to receive data regarding a party;
extracting, by performing a neural network based named-entity recognition (NER) on the data sources, entities from the data to receive a set of entities, wherein the party is a first entity of the set of entities;
building an ontological structure that interrelates entities within the set of entities;
determining an initial relationship strength between the first entity and a second entity based on a number of times the first and second entities co-occur divided by a total number of times the first entity co-occurs with each other entity within the set of entities, wherein the second entity is a second party;
determining a timeline of co-occurrence between the first and second entities, wherein the timeline of co-occurrence includes an initial co-occurrence time, a frequency of co-occurrence over time, and a recency of a last co-occurrence between the first and second entities;
calculating a normalized timeline of co-occurrence value based on the timeline of co-occurrence; and
calculating a relationship score between the first and second entities by adding the initial relationship strength multiplied by a first weight and the normalized timeline of co-occurrence value multiplied by a second weight, wherein the relationship score represents a risk that the party and the second party are involved in fraudulent activity;
comparing the relationship score to a threshold; and
denying, in response to the relationship score exceeding the threshold, a transaction initiated by the party.

9. The system of claim 8, wherein the number of times the first entity and second entity co-occur is a co-occurrence between the first and second entities, wherein prior to calculating the relationship score, the method performed by the one or more processors further comprises:
determining a set of reasons for the co-occurrence between the first and second entities, wherein the relationship score is calculated based on the initial relationship strength and the set of reasons for the co-occurrence.

10. The system of claim 8, wherein prior to calculating the relationship score, the method performed by the one or more processors further comprises:
determining a network of entities of the set of entities that relate first and second entities, wherein the relationship score is calculated based on the initial relationship strength and the network of entities.

11. The system of claim 8, wherein the relationship score is appended to the ontological structure as an attribute to a relationship between the first and second entities.

12. A computer program product comprising one or more computer readable storage media, and program instructions collectively stored on the one or more computer readable storage media, the program instructions comprising instructions configured to cause one or more processors to perform a method comprising:
querying data sources to receive data regarding a party;
extracting, by performing a neural network based named-entity recognition (NER) on the data sources, entities from the data to receive a set of entities, wherein the party is a first entity of the set of entities;
building an ontological structure that interrelates entities within the set of entities;
determining an initial relationship strength between the first entity and a second entity based on a number of times the first and second entities co-occur divided by a total number of times the first entity co-occurs with each other entity within the set of entities, wherein the second entity is a second party;
determining a timeline of co-occurrence between the first and second entities, wherein the timeline of co-occurrence includes an initial co-occurrence time, a frequency of co-occurrence over time, and a recency of a last co-occurrence between the first and second entities;
calculating a normalized timeline of co-occurrence value based on the timeline of co-occurrence; and
calculating a relationship score between the first and second entities by adding the initial relationship strength multiplied by a first weight and the normalized timeline of co-occurrence value multiplied by a second weight, wherein the relationship score represents a risk that the party and the second party are involved in fraudulent activity;
comparing the relationship score to a threshold; and
denying, in response to the relationship score exceeding the threshold, a transaction initiated by the party.

13. The computer program product of claim 12, wherein the number of times the first entity and second entity co-occur is a co-occurrence between the first and second entities, wherein prior to calculating the relationship score, the method performed by the one or more processors further comprises:
  determining a set of reasons for the co-occurrence between the first and second entities, wherein the relationship score is calculated based on the initial relationship strength and the set of reasons for the co-occurrence.

14. The computer program product of claim 12, wherein prior to calculating the relationship score, the method performed by the one or more processors further comprises:
  determining a network of entities of the set of entities that relate first and second entities, wherein the relationship score is calculated based on the initial relationship strength and the network of entities.

15. The computer program product of claim 12, wherein the relationship score is appended to the ontological structure as an attribute to a relationship between the first and second entities.

16. The computer program product of claim 12, wherein the program instructions are downloaded to the computer readable storage medium from a distributed data processing system.

* * * * *